(12) United States Patent
Smith

(10) Patent No.: X8797
(45) Date of Patent: Apr. 22, 1835

(54) LOOM, WEAVING, FIGURED GOODS

(76) Inventor: John Smith

John Smith, of Shaefferstown, State of Pennsylvania
Letters Patent.

The schedule referred to in these Letters Patent and making part
of the same, containing a description in the words of the said
John Smith himself of his improvement in the Loom for
weaving Figured work,
To all whom it may concern.
Be it known that I John Smith of of Shaefferstown in the
County of Lebanon & State of Pennsylvania, have invented certain
improvements in the Loom for weaving figured work. which improve
-ment appertain principally to that part of the Loom which operate
upon the Drawboys and their appendages which are concerned
in forming the pattern to be woven, In the figure Loom commonly
employed, there are pins in a cylinder, which as the cylinder
is turned, operate upon the shifters, and force them back, a
mode of procedure which produces considerable resistance, in
the working of the Loom. and in damp weather not unfrequently
causes the pins to break or produces other inconveniences
By my improvement the shifters are drawn back by means
of a treadle connected with an upper treadle or lever acting like
those which lift the draw boys. This lever stands in a line with
the draw boy levers, and when it is drawn down by a treadle
a friction roller attached to it is brought into contact with a
latch on the upper end of a vertical lever, the lower end of which
is fixed in a roller or shaft which crosses the frame work, and
turns upon gudgeons, This vertical lever is forced back by the
friction roller, and is so connected with the shifters as to
draw them back, with it, and whilst at the same time the
cylinder is turned to the proper distance in a way to be presently
described, When this is effected the latch ~~the latch~~ from its con construction, disengages itself from the friction roller and the vertical
lever is forced forward into its place by a spring — thus causing the
shifters also to return to their places and stand between the pins on the cylinder
The Drawing deposited in the Patent office, will more distinc
tly shew, the arrangement of this and other parts of the apparatus
than they can be made known in words only. The same lever which
carries the friction rollers is made to turn the cylinder, it has
for this purpose a strap or band fastened to its inner end, which
passes round a pulley, by the action of which a lever is raised,
which is so connected as to push the feed hand or pall, that
operates on ratchet teeth on the end of the cylinder in the
usual way, — I adapt the same Loom to the weaving
of fine work, such as coverlids, or of coarse work such as carpets,
by shifting the gears, which operate upon the draw boys, for this
purpose I employ the double draw boy somewhat similar to that
used in the double carpet Loom, but different from it in caus
ing it to work either of two sets of gears, but only one at the
same time, whilst in that calculated for double work, both sets
of draw boys are worked together whilst I use only one set upon
the same work, shifting them as may be necessary, my Loom not
being calculated for double work,
What I claim as my invention, is the arrangement of that
part of the Loom just described, by which the shifters are drawn
instead of being forced back by the action of the pins upon the
cylinder, and this I claim whether the effect be produced pre
cisely in the manner represented or in any other which is sub-
stantially the same; I also claim the mode of connecting the lever
which draws the shifters back, by which the cylinder is turned
at the proper time & to the proper distance,
I claim likewise the employment of the two sets of gears
in the same Loom, in the manner described by which it is
adapted either to coarse or fine work, It is to be understood
that I do not intend to claim the individual parts connected in in either of these operations, but only that general arrangement and connection of these parts by which new and useful effects are produced.

Witness

George Thalke

Saml. Stettinius

Wm Smith

Ex.d

Ch. fl.

780 words